United States Patent Office

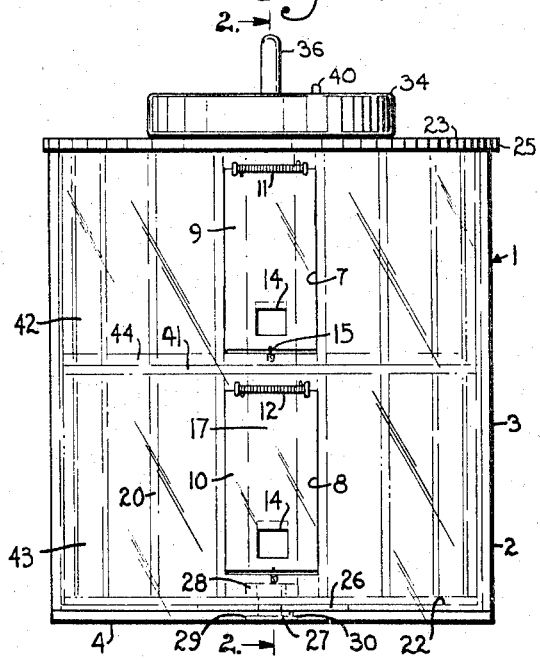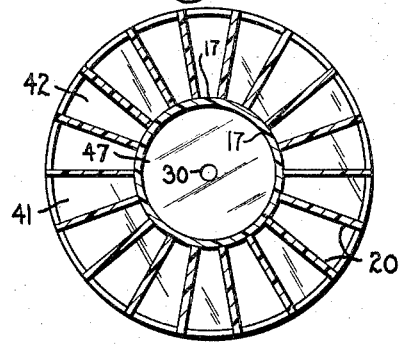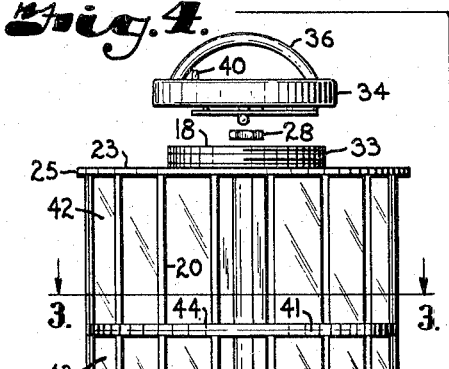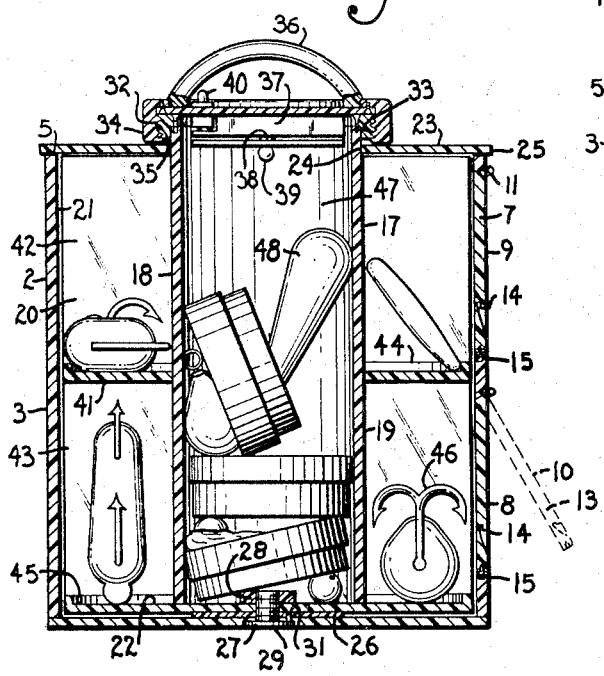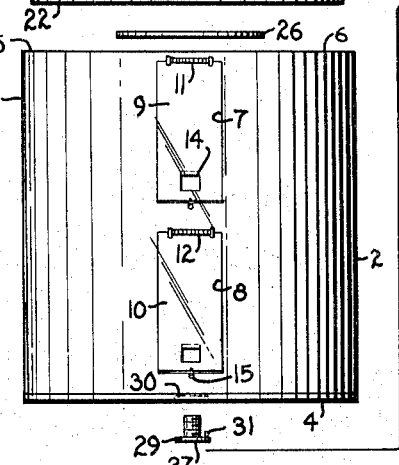
INVENTORS.
HARVEY H. WILKINSON and
CHARLES E. HARKRIDER
BY Fishburn and Gold
ATTORNEYS

3,378,134
Patented Apr. 16, 1968

3,378,134
COMPARTMENTALIZED CONTAINER
Harvey H. Wilkinson, 5625 Harvard, Raytown,
Mo. 64133, and Charles E. Harkrider, 125D
Lake Tapawingo, Blue Springs, Mo. 64015
Filed Apr. 18, 1966, Ser. No. 543,138
8 Claims. (Cl. 206—16)

ABSTRACT OF THE DISCLOSURE

A transparent compartmentalized container has a rotatable core member received in an upwardly open outer shell having a side and bottom wall. The core member includes a hollow cylindrical inner member from which a plurality of vertical walls radiate. Upper, lower and intermediate transverse walls on the inner member intersect the vertical walls thereby forming a plurality of upper and lower compartments positioned intermediate the ends of the core member. The intermediate and lower transverse walls each have a peripheral ledge extending upwardly therefrom to retain items thereon with the upper transverse wall closing the upper compartments. Upper and lower doors in the side wall of the outer shell provide access into respective compartments. A cap is threadedly engaged with the upper end of the core member to provide access into a storage space within the inner member and includes a handle for carrying the container, rotating the core member within the shell and lifting the core member out of the shell.

---

This invention relates to multiple compartment containers and, more particularly, to such containers which are well adapted to store, display and dispense artificial fishing lures and fishing tackle components.

Conventional tackle boxes often prove troublesome in service for several reasons, among which are the tendency to permit lures and tackle components to become tangled into a mass dangerous and inconvenient to handle, inability to display contents for fast comparative selection, excessive space requirements for opening and closing in cramped quarters such as in a small boat, instability when opened, and the propensity to rapidly sink if accidently dropped overboard into water.

The principal objects of the present invention are: to provide a container which is well adapted to safety and conveniently enclose artificial fishing lures and fishing tackle components; to provide such a container which clearly displays the contents thereof although in closed condition; to provide such a device which, for its size, maintains a comparatively great number of lures in individual compartments; to provide such a container which is stable in both open and closed condition; to provide such a storage device which permits the rapid deposit, selection and removal of items contained therein with great ease; to provide such a tackle box which will float if accidently dropped overboard into the water; to provide such a box which includes internal illuminating means for use during darkness; and to provide such a container which is relatively simple and inexpensive in construction and well suited for its intended purpose.

Other objects and advantages of this invention will become apparent from the following description taken in connection with the accompanying drawings wherein are set forth by way of illustration and example certain embodiments of this invention.

FIG. 1 is a front elevational view showing a container embodying this invention.

FIG. 2 is a vertical cross-sectional view taken on the line 2—2, FIG. 1, showing typical compartments in and the internal construction of the container.

FIG. 3 is a cross-sectional plan view through the container core member taken on the line 3—3, FIG. 4, particularly showing the radial wall structure and inner cylinder.

FIG. 4 is an exploded elevational view showing various parts of the container dissassembled.

Referring to the drawings in more detail:

The reference numeral 1 generally indicates a compartmentalized container embodying this invention. The container 1 includes an outer rigid shell 2 having a vertically extending cylindrical outer side wall 3 of rigid transparent synthetic resin and an outer bottom circular end wall 4. The shell 2 has an upper circular edge defining an open top end 6. Upper and lower access openings respectively designated 7 and 8 extend transversely through the outer side wall 3, in this example, in aligned vertically spaced apart relation. Access doors 9 and 10 are hingedly connected to the side wall 3 at 11 aad 12 for pivotal movement upwardly between positions closing the respective access openings 7 and 8 and positions directed outwardly of the side wall 3 exposing the respective access openings as illustrated by the broken lines at 13. Suitable fingernail engaging ridges 14 are formed in the access doors 9 and 10 near the end opposite the hinges at 11 and 12 to permit grasping the doors for opening same, the doors, when closed, being flush with the outer surface of the side wall 3 and maintained in this position by suitable friction latches 15.

A core member 16 is telescopically received in the shell 2 and comprises a vertically extending cylinder or cylindrical inner side wall 17 of transparent rigid synthetic resin and of substantially smaller outside diameter than the inside diameter of the outer side wall 3. The cylinder or side wall 17 has an upper end 18 and a lower end 19 and is substantially coaxial with the cylindrical outer side wall 3. A plurality of circumferentially spaced rectangular radial walls 20, also preferably of transparent rigid synthetic resin, are rigidly secured to the cylindrical inner wall 17 between the upper and lower ends 18 and 19 thereof and extending radially outwardly therefrom to positions adjacent the inside surface 21 of the cylindrical outer wall 3.

The core member 16 includes a circular bottom wall 22 closing the lower end 19 and radially extending to a diameter adjacent the inside surface 21 of the cylindrical outer wall. The core member 16 further includes a circular top wall 23 having a central circular opening 24 through which is projected the upper end 18 of the inner cylindrical wall 17, as best illustrated in FIG. 2. The top wall 23 has an outer rim portion 25 which extends over and in close relation to the upper edge 5 of the cylindrical outer wall 3.

A thrust bearing plate or washer 26, preferably of a synthetic material having a low coefficient of friction, such as nylon, is located between and slidably contacting the core member bottom wall 22 and the shell end wall 4, maintaining a slight separation therebetween. An axial shaft in the form of a bolt 27 extends through the bottom walls 4 and 22 and the washer 26, threadedly receiving a lock nut 28 on the inside of the cylindrical inner wall 17 to retain the core member 16 within the shell 2, but permitting relative rotational motion therebetween on a common axis. The bolt 27 has a flat head 29 which is received into a recessed portion 30 formed in the shell bottom wall 4 so that the head does not project from the bottom of the container. The bolt head 29 has a pin 31 extending upwardly therefrom which is received in a suitable opening formed in the bottom wall 4 to prevent the bolt from rotating as the nut 28 is engaged therewith. The head 29 forms a substantially watertight fit with the bottom wall 4 so that water cannot enter through the bolt opening into the interior of the cylindrical side wall 17.

A ring member 32 is suitably secured to the upper end 18 of the inner cylindrical side wall 17 and has external screw threads 33 spaced slightly above the top wall 23. A cap member 34 has internal threads 35 adapted to cooperate with the screw threads 33 for selectively closing the upper end 18 of the cylindrical side wall 17. The cap member 34 includes a handle 36 extending upwardly therefrom for grasping and carrying the entire container as well as providing a grip for unscrewing and removing the cap member 34 when desired. The cap member 34 includes a suitable internal chamber 37 for receiving dry cell batteries and a socket 38 for supporting and electrically connecting a flashlight bulb 39 to the batteries through a suitable switch 40 conveniently positioned near the handle 36.

Approximately midway between the top wall 23 and bottom wall 22 and extending parallel thereto are wall dividers 41 which are received between each adjacent pair of radial walls 20. The dividers 41 cooperate with the respective radial walls 20 to form adjacent circumferentially positioned upper compartments 42 serviced by the access door 9 and similar lower compartments 43 serviced by the lower access door 10. Upwardly extending peripheral ledges 44 and 45 are formed at the outer edges of the bottom wall 22 and the dividers 41 to aid in reducing potential rubbing between the contents of the compartments and the inside surface 21 during relative rotation between the core and shell as noted below.

In operation, the respective doors 9 and 10 may be opened and fishing lures 46 or the like are inserted to fill the respective compartments 42 and 43 as the core member 16 is rotated with respect to the shell 2 by the handle 36. The inserted lures may be easily observed from a stationary position without removal or opening the doors either by lifting and rotating the entire container or by rotating the core member with respect to the container shell. The cap member 34, when removed, permits access to the interior 47 of the inner cylindrical side wall 17 to be used as an additional compartment for receiving larger or additional components 48 such as reels, spools, tools and special equipment.

The container is advantageous in cramped quarters, such as in a small boat, since, unlike conventional tackle boxes, no extra space is required to display and locate the desired lure. The core member 16 is merely rotated until the desired lure appears at the corresponding access door. The door is opened and the lure simply removed from the compartment. Access to the components 48 is easily obtained by unscrewing and removing the cap member 34. In darkness, by actuating the switch 10, the entire contents of the container are illuminated for removal or for insertion of items. Should the container fall overboard, no water may enter the interior 47 of the cylindrical inner side wall 17, thus providing sufficient buoyancy so that the container will not sink. If the container is not removed from the water quickly, some water may enter into the compartments 42 and 43 between the close fitting doors 9 and 10 and the edges of the door openings and perhaps between the top wall 23 and outer cylindrical wall upper edge 5; however, the buoyancy of the interior 47 alone is normally sufficient to support the entire loaded container.

Although one form of this invention has been illustrated and described, it is not to be limited thereto except insofar as such limitations are included in the following claims.

What we claim and desire to secure by Letters Patent is:

1. A compartmentalized container comprising:
  (a) an outer rigid shell having a transparent plastic cylindrical outer side wall and an outer bottom wall, an access opening extending transversely through said outer side wall, a door member on said side wall for selectively exposing said access opening;
  (b) a core member in said shell, said core member comprising a vertical cylindrical inner side wall of smaller outside diameter than the inside diameter of said outer side wall and having upper and lower ends, said cylindrical inner side wall being substantially coaxial with said cylindrical outer side wall, said inner side wall having a plurality of circumferentially spaced upwardly directed radial walls secured thereto between said upper and lower ends and extending radially outwardly therefrom to positions adjacent the inside surface of said cylindrical outer side wall, said radial walls and inner side wall and outer side wall forming a plurality of circumferentially positioned compartments;
  (c) said core member including a transverse wall engaging said radial walls and forming the bottom of at least some of said compartments, said transverse wall having a peripheral ledge extending upwardly therefrom adjacent the inside surface of said outer side wall, a top wall on said container, and
  (d) bearing means including a shaft extending between said core member and said outer shell bottom wall permitting relative rotational coaxial motion therebetween for selectively aligning said compartments with said access opening.

2. The structure as set forth in claim 1 including:
  (a) a plurality of said transverse walls each having a peripheral ledge extending upwardly therefrom and positioned below said top wall, said transverse walls each forming a separate level of compartments,
  (b) an access opening positioned above each of said transverse walls and extending through said outer side wall to provide access into each of said respective levels of compartments, and
  (c) a door member on said side wall for each of said access openings.

3. The structure as set forth in claim 1 wherein said side door member includes:
  (a) a door having an upper edge, and
  (b) a hinge connected between said upper edge and said outer side wall whereby said door swings upwardly to open.

4. The structure as set forth in claim 3 wherein said door member includes:
  (a) a bottom edge aligned with the top edge of said peripheral ledge.

5. A compartmentalized container comprising:
  (a) an outer rigid shell having a transparent cylindrical outer side wall and an outer bottom wall, an access opening extending transversely through said outer side wall, a door member on said side wall for selectively exposing said access opening;
  (b) a core member in said shell, said core member comprising a vertical cylindrical inner side wall of smaller outside diameter than the inside diameter of said outer side wall and having upper and lower ends and storage space therewithin, said cylindrical inner side wall being substantially coaxial with said cylindrical outer side wall, said inner side wall having a plurality of circumferentially spaced upwardly directed radial walls secured thereto between said upper and lower ends and extending radially outwardly therefrom to positions adjacent the inside surface of said cylindrical outer side wall, said radial walls and inner side wall and outer side wall forming a plurality of circumferentially positioned compartments;
  (c) said core member including a transverse wall engaging said radial walls and forming the bottom of at least some of said compartments, said core member having a top wall at least partially covering said radial walls and having a central opening providing access into said inner side wall storage space;

(d) bearing means including a shaft extending between said core member and said outer shell bottom wall permitting relative rotational coaxial motion therebetween for selectively aligning said compartments with said access opening;
(e) engaging means associated with said inner side wall upper end;
(f) a cap member having engaging means cooperable with said inner side wall engaging means for selectively closing said inner side wall upper end; and
(g) a handle mounted on said cap member for carrying said container and selectively rotating said core member with respect to said outer shell.

6. The container as set forth in claim 5 wherein:
(a) said top wall is secured to said radial walls,
(b) said inner side wall upper end extends upwardly through said central opening,
(c) said cooperable engaging means on said inner side wall upper end are screw threads, and
(d) said cooperable engaging means on said cap member are screw threads.

7. The container as set forth in claim 5 wherein said cap member includes:
(a) an internal chamber, and
(b) illuminating means mountable therein, said illuminating means having a bulb normally projecting into said core member storage space for illuminating said container.

8. The container as set forth in claim 5 wherein:
(a) said core member includes a flat bottom wall closing the bottom of said inner side wall,
(b) said bearing means includes a circular washer having a low coefficient of friction, said washer having an outside diameter substantially equal to the diameter of said inner side wall; and
(c) said washer slidably engages said core bottom wall and outer shell bottom wall to maintain said core member and outer shell coaxial.

References Cited
UNITED STATES PATENTS

| | | | |
|---|---|---|---|
| 899,466 | 9/1908 | O'Leary | 206—1 |
| 2,683,642 | 7/1954 | Stoleson | 206—1 |
| 2,765,576 | 10/1956 | Kurek | 220—20 |
| 3,022,600 | 2/1962 | Glascoff | 43—54.5 |

WILLIAM T. DIXSON, JR., *Primary Examiner.*